(12) United States Patent  
Islamov

(10) Patent No.: US 9,794,435 B1  
(45) Date of Patent: Oct. 17, 2017

(54) SYSTEM AND METHOD FOR ARRANGING SCANNED IMAGES

(71) Applicant: CA, Inc., Islandia, NY (US)

(72) Inventor: Renat Islamov, Framingham, MA (US)

(73) Assignee: CA, Inc., New York, NY (US)

( * ) Notice: Subject to any disclaimer, the term of this patent is extended or adjusted under 35 U.S.C. 154(b) by 18 days.

(21) Appl. No.: 14/015,675

(22) Filed: Aug. 30, 2013

(51) Int. Cl.
 *H04N 1/00* (2006.01)
 *G06F 17/21* (2006.01)
 *G06F 3/12* (2006.01)
 *G06K 15/02* (2006.01)

(52) U.S. Cl.
 CPC ......... *H04N 1/00456* (2013.01); *G06F 3/125* (2013.01); *G06F 17/212* (2013.01); *G06K 15/1885* (2013.01)

(58) Field of Classification Search
 CPC  H04N 1/00456; G06K 15/1885; G06F 3/125; G06F 17/212
 See application file for complete search history.

(56) References Cited

U.S. PATENT DOCUMENTS

| | | | |
|---|---|---|---|
| 6,975,434 B1* | 12/2005 | Pilu | H04N 1/0402 358/450 |
| 2002/0040375 A1* | 4/2002 | Simon | G06T 11/60 715/251 |
| 2005/0094228 A1 | 5/2005 | Sevier | |
| 2012/0274970 A1* | 11/2012 | Cok | H04N 1/32128 358/1.14 |

OTHER PUBLICATIONS

"WF-3520/WF-3530 Users Guide." Date of first publication: Oct. 2012. Epson America, Inc. Long Beach, CA.

* cited by examiner

*Primary Examiner* — Nicholas Pachol
(74) *Attorney, Agent, or Firm* — Coats & Bennett, PLLC

(57) ABSTRACT

A photocopier optically scans a series of documents into corresponding digital images. Prior to printing an image on a print medium, such as paper, the photocopier arranges the scanned images on a preview page for display to a user. The user previews the images on the display to ensure that the images are aligned and do not overlap, and then prints the digital images to a single sheet. The images are printed to the single sheet as they are arranged on the preview page being displayed to the user.

15 Claims, 9 Drawing Sheets

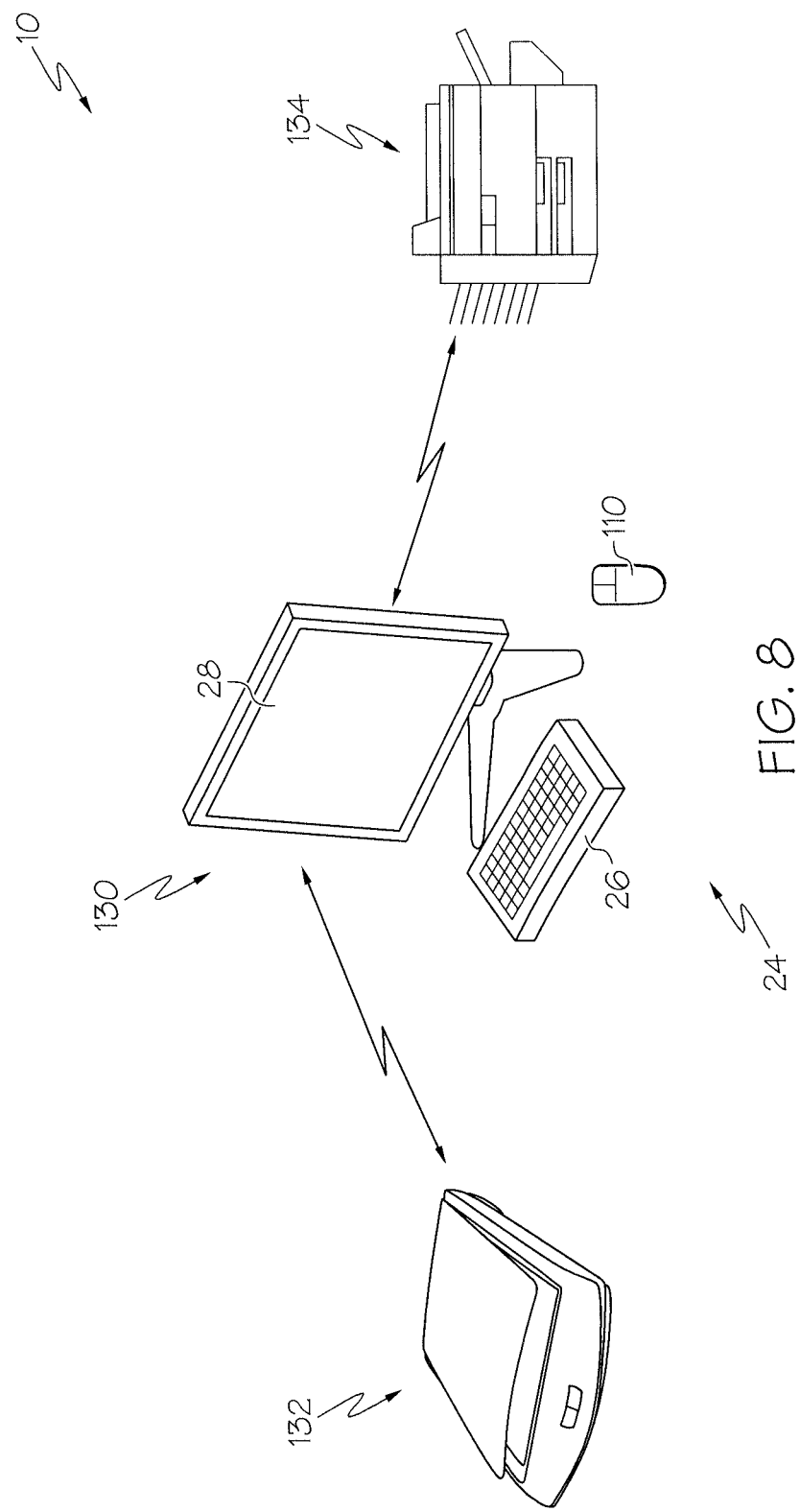

SYSTEM AND METHOD FOR ARRANGING SCANNED IMAGES

BACKGROUND

The present disclosure relates to imaging systems, and more specifically, to systems and methods for capturing and arranging images of documents for display on a display device.

Imaging systems, such as photocopiers and flatbed scanning devices, for example, are widely used in business, education, and government, as well as for personal use, to capture images of documents and print them to a piece of paper. Generally, known imaging systems scan many different predefined sizes for documents for printing, such as "Letter," "Legal," and "A4." However, it is often necessary to scan and print documents that are not of a predefined size, such as photographs, driver licenses, identification cards, registration cards, and insurance cards. In some cases, it may be necessary to scan and print the front and back of such documents.

To scan both sides of such a document, such as an ID card, the user typically must perform a tedious process. Particularly, the user must first control the system to scan a front side of the document and print the scanned image to a piece of paper retrieved by the system from a feed tray. The user must then take that piece of paper and place it back into the same feed tray, or another feed tray, flip the ID card over to scan the back side of the ID card, and then print the scanned image to the same sheet of paper. Notably, the user must be careful to orient the paper in the feed tray such that the subsequently captured image of the back side of the ID card will be printed on the same side of the paper without overlapping the already printed image of the front side of the document. If the printed images overlap, or if the printed images are not aligned properly, the user must redo the entire scan and print process from the beginning.

BRIEF SUMMARY

The present disclosure provides a photocopier device and corresponding method for optically scanning documents into corresponding digital images. Typically, the images will be printed to print media, such as paper. However, according to aspects of the present disclosure, the photocopier arranges the images on a single page layout for display to the user prior to printing the images. So displayed, the user is able to visually inspect the images to ensure that the images are aligned and do not overlap. Once satisfied, the user prints the digital images. In one aspect, the digital images being displayed to the user are printed to a single sheet of paper as they are arranged on the preview page.

In one aspect of the present disclosure, the photocopier comprises an optical scanner, a display, and a controller. The controller is communicatively connected to the optical scanner and the display, and is configured to generate a first digital image corresponding to a document scanned by the optical scanner during a scanning session. The controller is configured to display the first digital image along with a second digital image, which corresponds to a document previously scanned by the optical scanner during the scanning session, in a single page layout. The controller prompts the user to indicate whether to keep the first digital image in the single page layout, and then prints the first and second digital images on a single sheet of paper as arranged in the single page layout if the user chooses to keep the first digital image in the single page layout.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 8 is a perspective view of another imaging system configured according to an embodiment of the present disclosure.

DETAILED DESCRIPTION

Figure 1:
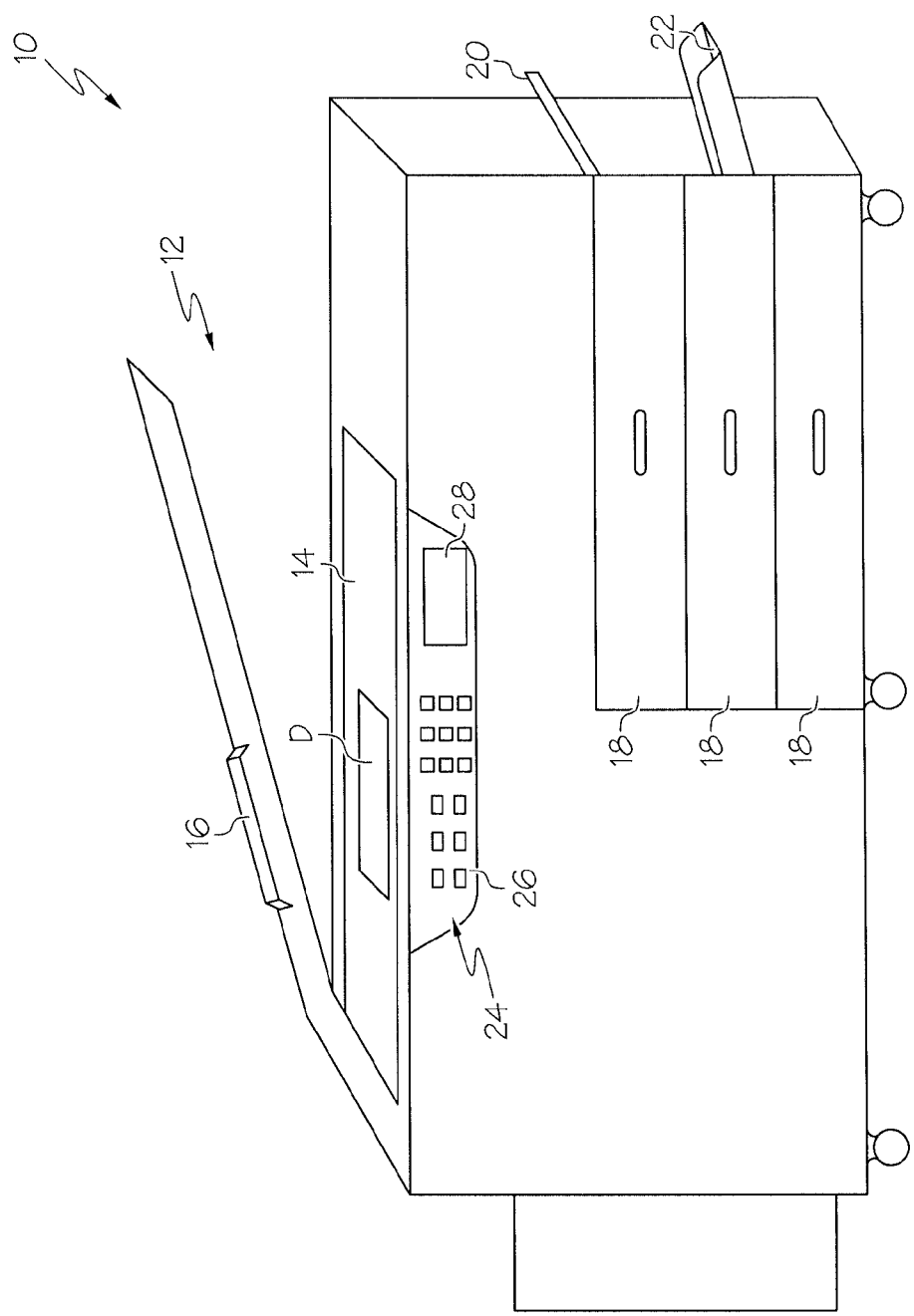
FIG. 1 is a perspective view of a photocopier configured according to one embodiment of the present disclosure.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a photocopier and a corresponding method implemented on a photocopier for scanning one or both sides of one or more documents into corresponding digital images, and for printing those images to a print media, such as paper, for example. More particularly, aspects of the present disclosure control a photocopier to scan one or more sides or parts of one or more documents during a single scanning session. As used herein, a "scanning session" is defined as a session in which the photocopier is controlled to optically scan one or both sides of one or more documents in series. The documents may be placed and scanned individually as a user manually places a document on the photocopier scanner, or placed in a document feeder and fed to the scanner automatically. Regardless of the document feed method, however, the documents being scanned may or may not be the same size and/or shape, and are scanned into a corresponding number of digital images. The photocopier then arranges the scanned images on a preview page and displays the arrangement on a display to the user. Based on the previewed arrangement of images, the user is able to visually inspect the images to ensure that they are clear, properly aligned, and do not overlap. If the user is not satisfied, the user can cause the photocopier to simply discard the image from the preview or rearrange the images on the preview. Otherwise, the user can print the scanned images on a sheet of paper or other print media as arranged on the display.

Photocopiers configured according to aspects of the present disclosure provide benefits and advantages that existing photocopiers do not, or cannot, provide. For example, with a photocopier configured according to the present disclosure, a user can see, in advance, how the images would appear if printed on a print medium prior to actually printing the images. Thus, if images were misaligned or overlapped during the scanning process, for example, the user could simply discard the image or correct the alignment without having to begin the scanning process over from the beginning. Not only does this save the resources that are used to print and scan the documents, such as paper, toner, ink, power, etc., but it also reduces user frustration and the total time needed to scan the documents. Moreover, the process of the present disclosure makes it easy for users to create and print arrangements of images by eliminating the need for a user to mentally arrange and align the document images on a print medium before printing the images to the print medium.

Turning now to the drawings, FIG. 1 is a perspective view of a photocopier 10 configured according to an aspect of the present disclosure. Photocopier 10, as seen in FIG. 1, comprises a scan area 12 having a glass scanning surface 14 and, in some cases, a document feeder 16. Photocopier 10 also comprises a user interface 24 having user controls 26 and/or a touch-sensitive display 28, a plurality of feed trays 18, each for differently-sized paper, a manual feed tray 20, and an output tray 22 to receive printed images.

Generally, a user places a document D to be scanned and printed face down on the glass scanning surface 14. Alternatively, the user may place the document D, or a plurality of documents D, in the document feeder 16 to be automatically fed to the glass scanning surface 14. The user then enters commands via user controls 26 and/or the touch-sensitive screen 28. The user commands cause scanning circuitry, such as an optical scanner housed within the photocopier 10, for example, to employ a well-known and understood process to capture an image of the surface of document D facing the glass scanning surface 14. Once scanned, the photocopier 10 obtains a single sheet of paper from one of the feed trays 18, or from the manual feed tray 20, and prints the scanned image on the paper for output to the output tray 22.

Conventionally, a single scanned image of document D is printed on a surface of a corresponding single sheet of paper. In some cases, multiple scanned images may be printed on the same side of the same sheet of paper. However, with conventional photocopiers, printing multiple images on the same side of a single sheet of paper can be problematic and frustrating for the user.

Figure 2:
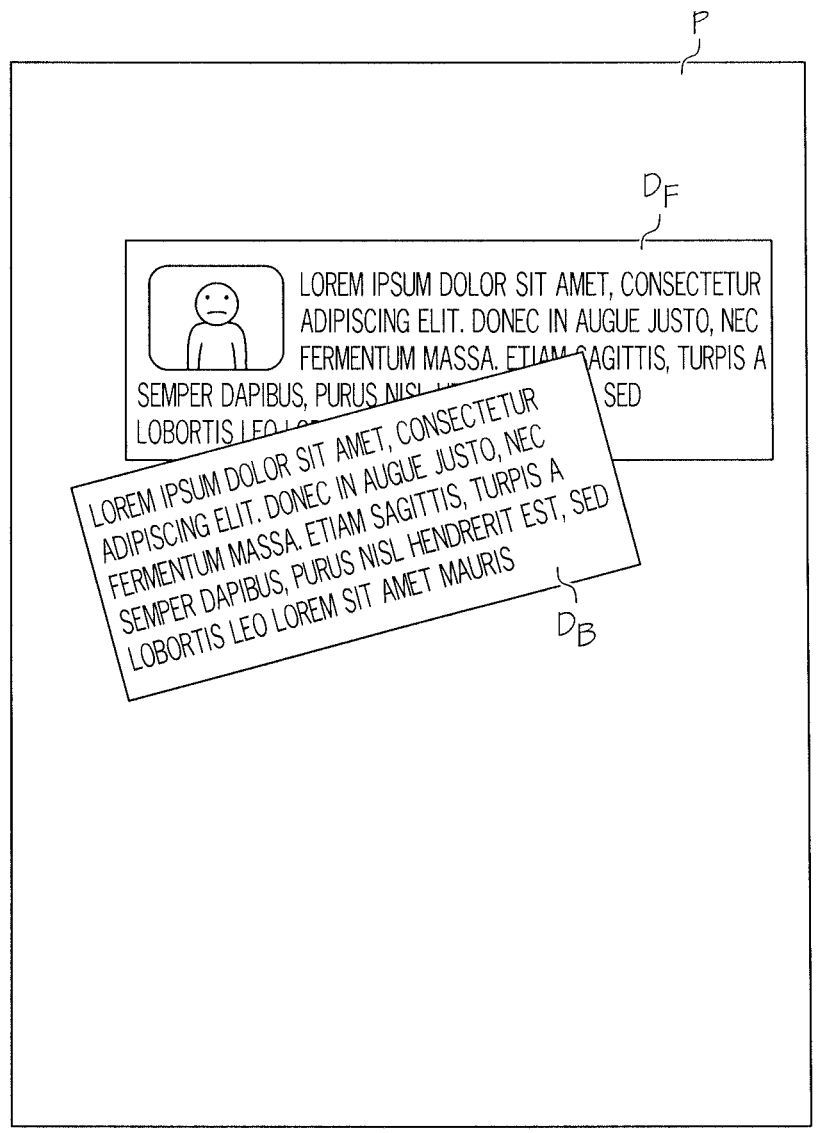
FIG. 2 is a perspective view showing the front and back sides of a scanned document printed on the same side of a piece of paper using a conventional method.

For example, as seen in FIG. 2, the scanned images of the front and back sides $D_F$, $D_B$, of a document D may overlap each other when printed to the paper P if the user does not place the document D in the correct place on glass scanning surface 14. Additionally, other issues may arise where the front $D_F$ is printed on one side of the paper P, while the back side $D_B$ of the document is printed upside down relative to the front side of $D_F$ and/or on the opposite side of the sheet of paper P. As previously stated, such situations may be caused by the user improperly orienting the sheet paper P within a feed tray 18, 20 after printing the front side $D_F$ of the document D on paper P, or placing the back side $D_B$ of document D in the wrong place on the glass scanning surface 16. In these situations, the resources used by conventional photocopiers are wasted as the user must throw the printed copy in the trash and once again repeat the scanning and printing process.

Figure 3A:
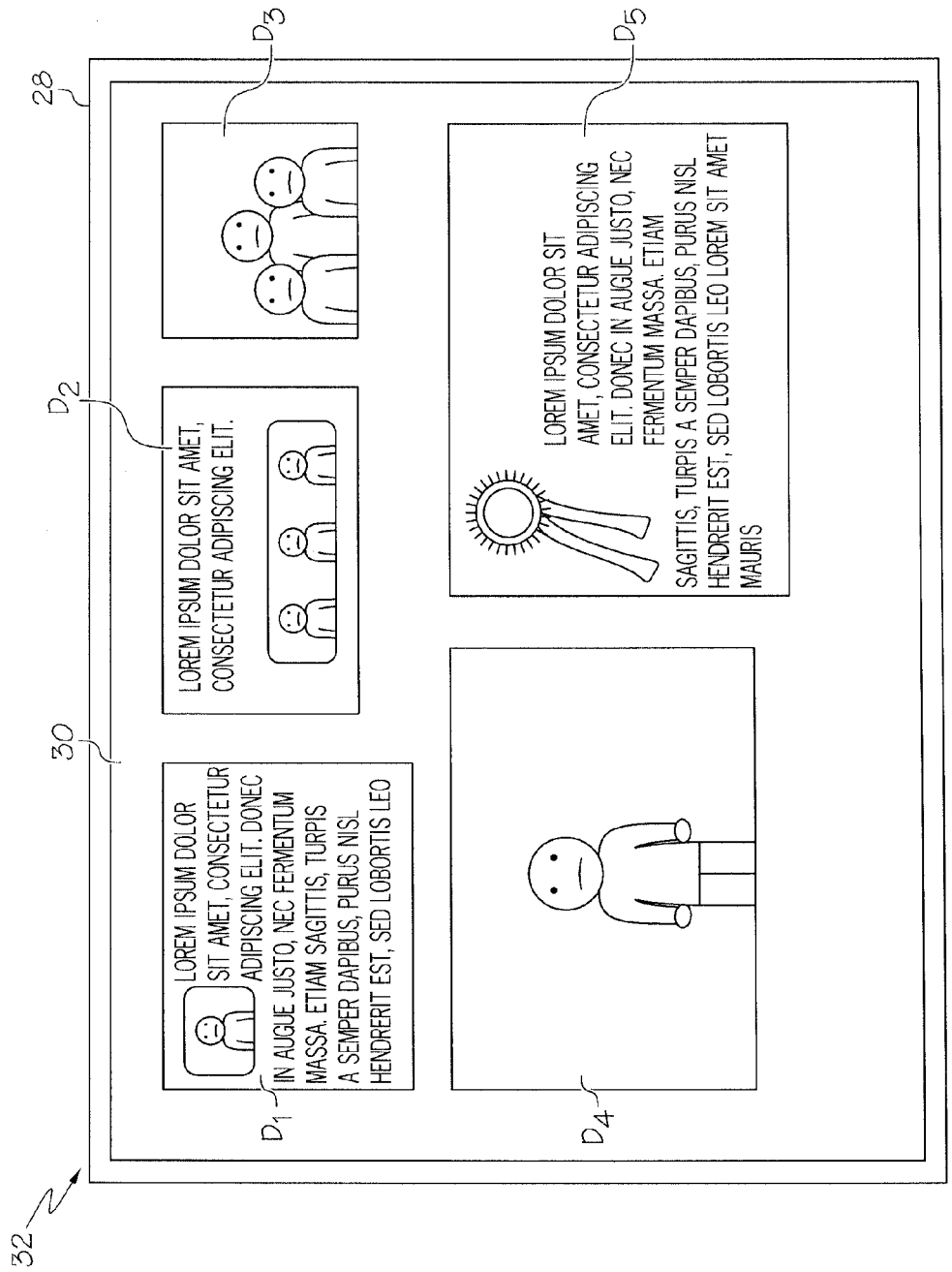
FIG. 3A is a perspective view of a preview page showing an arrangement of scanned images on a display according to an embodiment of the present disclosure.
Figure 3B:
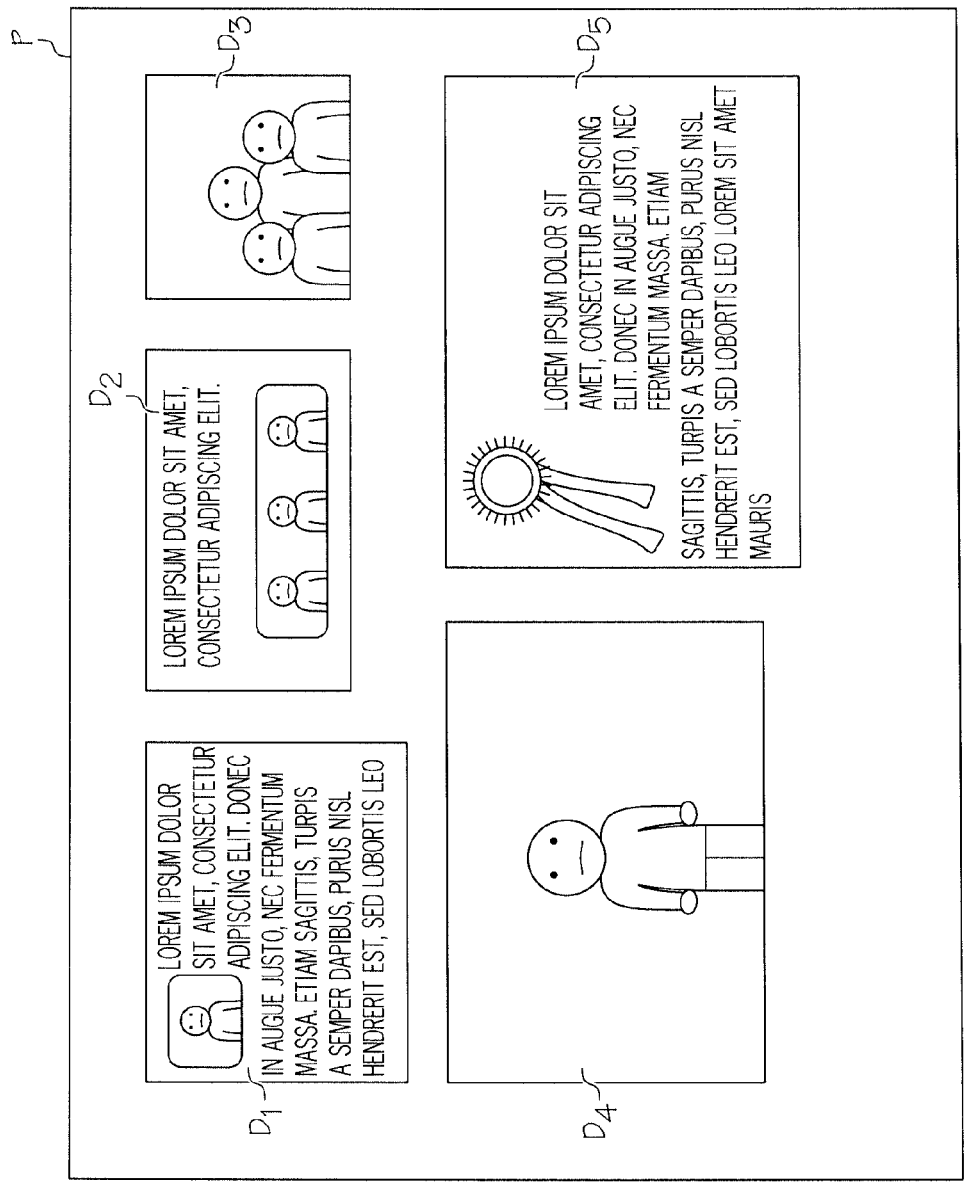
FIG. 3B is a perspective view of the arrangement shown in the preview page of FIG. 3A printed to a piece of paper according to an embodiment of the present disclosure.

A photocopier 10 configured according to the present disclosure, however, reduces both resource waste and user frustration by first arranging the scanned images on a display to allow the user to preview the orientation and arrangement of the images before printing. Particularly, as seen in FIGS. 3A-3B, a photocopier 10 configured according to an aspect of the present disclosure first performs a series of scans of a plurality of different documents D into a corresponding number of digital images $D_1 \ldots D_5$. The documents D are scanned during a single scanning session. Prior to printing the images, the photocopier 10 stores the digital images $D_1 \ldots D_5$ in memory, and arranges the digital images $D_1 \ldots D_5$ on a preview page 30 displayed on display 28. So displayed, the user can manipulate, rearrange, add, and discard the scanned digital images as needed or desired before printing the digital images $D_1 \ldots D_5$ on the sheet of paper P. As seen in FIG. 3B, the arrangement of the digital images $D_1 \ldots D_5$ corresponds to the arrangement of digital images $D_1 \ldots D_5$ displayed on the preview page 30.

Figure 4:
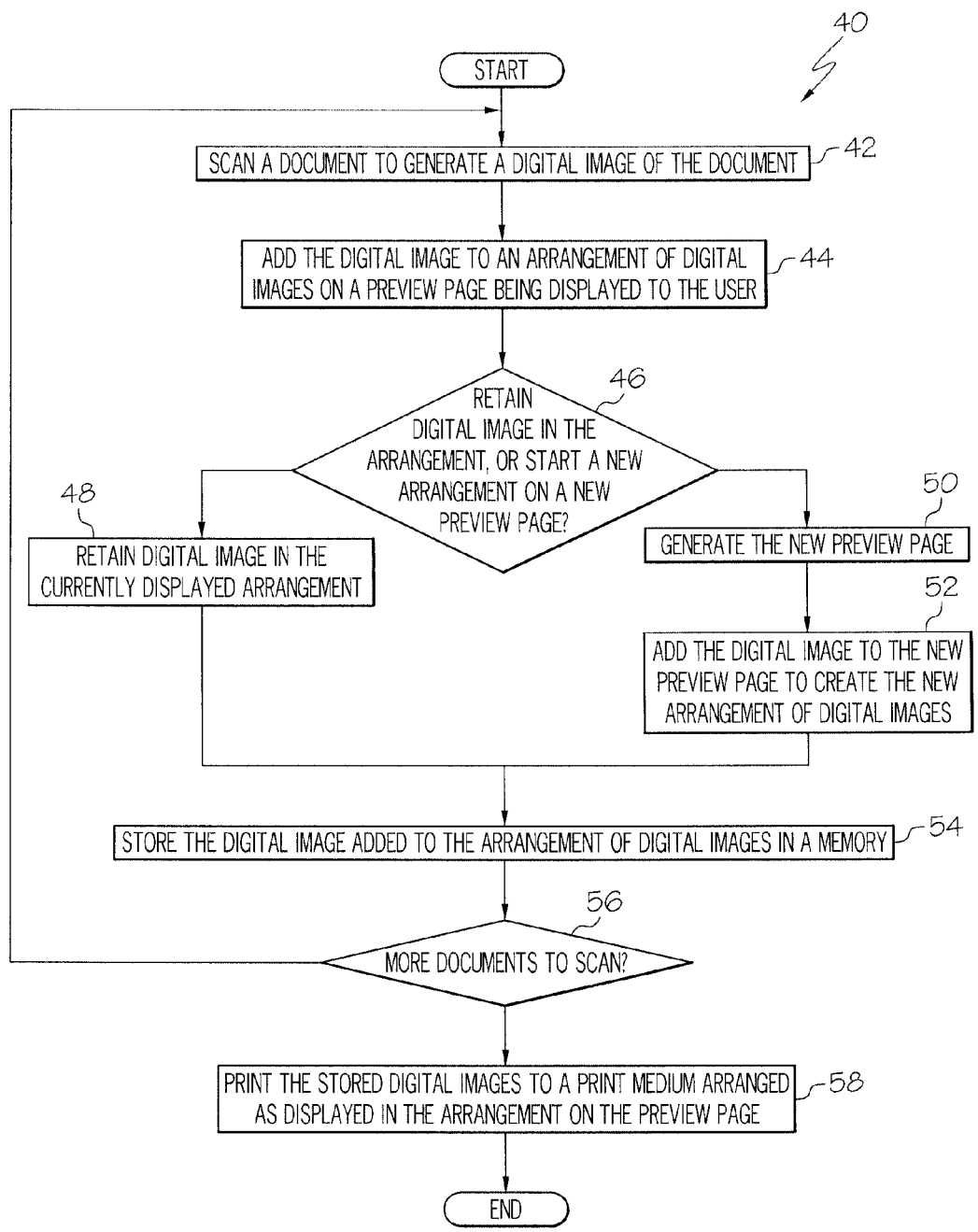
FIG. 4 is a flow diagram illustrating a method for scanning and printing a plurality of documents on a print medium according to an embodiment of the present disclosure.

FIG. 4 is a flow diagram illustrating a method 40 for generating the arrangement of digital images, such as images $D_1 \ldots D_5$, for example, and for displaying the arrangement of digital images on a preview page 30 of a display 28 associated with the photocopier 10.

Method 40 begins at the beginning of a scanning session with the user scanning a document D to generate a corresponding digital image of the document (box 42). Particularly, as is known in the art, document D may be placed on the glass scanning surface 14 by the user, or fed from the document feeder 16 along with one or more other documents. Scanning circuitry within the photocopier 10, such as an optical scanner, then utilizes well-known techniques to determine the proper dimensions of the document D, and scan the document D into a digital image at a desired resolution. Once scanned, the method 40 adds the digital image to an arrangement of digital images on a preview page 30 being displayed to the user on display 28 (box 44).

There are different ways in which a digital image may be added to the arrangement of digital images on the preview page 30. In one embodiment, for example, the preview page 30 may comprise a template having a predetermined number of "areas." Each area represents a place in the preview page 30 in which a digital image may be added. In accordance with this embodiment, the areas of the template that do not yet have an image are tracked. Whenever an image is to be added to the template, the photocopier 10 simply adds the scanned image to one of the open areas of the preview page 30.

In another embodiment, the photocopier 10 calculates and monitors the free or "open" space, specified in pixels, for example, that exists between the digital images in the preview page 30. To add an image, the photocopier 10 could simply determine whether the preview page 30 had an adequate amount of open or free space in the preview page 30 to receive the digital image. If so, the photocopier 10 could simply add the digital image to the preview page 30 in the identified open space. In some aspects, a minimum amount of free space, which may be predetermined or specified by the user, could be maintained between the images as a buffer or border for aesthetic purposes.

Regardless of how the image is added, method 40 will prompt the user as to whether to retain the digital image in the arrangement displayed on the current preview page 30, add the digital image to a new preview page 30, or discard the digital image, and instead, re-scan the document D (box 46). The prompt may, for example, comprise a dialog window that is displayed to the user and that accepts user input. If the user indicates that he or she would like to keep the digital image, method 40 will retain the digital image in its current position as displayed in the current arrangement on the preview page 30 (box 48). Alternatively, if the user indicates that he or she would like to place the digital image into a new arrangement (box 46), the method 40 will generate a new preview page (box 50) and add the digital image to the newly generated preview page (box 52). As stated above, the user could also indicate that he or she would like to discard the image and not place the digital image into the arrangement shown on the current preview page 30. In such cases, the method 40 would simply delete the digital image from the preview page 40 while leaving the remaining digital images accepted by the user in the preview page 30 intact.

Once the user indicates that the digital image will remain in the current preview page 30, or in a new preview page, the method 40 stores the digital image to a memory associated with the photocopier 10 (box 54). For example, in one aspect, the photocopier 10 stores both the digital image and an indicator identifying the digital image's current position in the arrangement in memory. The digital image may be written to one part of the memory, while the indicator may be written to a list. The list may include information linking the particular digital image to the defined properties of the preview page and the digital images within the preview page. Such information includes, but is not limited to, the coordinates of a corner of an image, the spacing between images, the maximum number of images allowed per preview, and the like. Those skilled in the art will appreciate that other information is also possible.

The method 40 then determines whether there are additional documents D to scan (box 56). The determination may be made by any means known in the art, but in one aspect, the user will indicate that scanning is finished via the user interface 24 of photocopier 10. If there are more documents D to scan, the method 40 repeats the above-defined process (i.e., boxes 42, 44, 46, 48/50-52, and 54). However, once the user indicates that there are no more documents D to scan, or when the photocopier 10 determines that there are no more documents D to scan, the scanning session ends. The photocopier 10 prints the stored images to a selected print medium, such as a piece of paper, for example (box 58). As stated above, the digital images are printed on the same side of a sheet of paper and arranged in the same positions and orientations as the digital images that are displayed in the arrangement of digital images on preview page 30.

Figure 5:
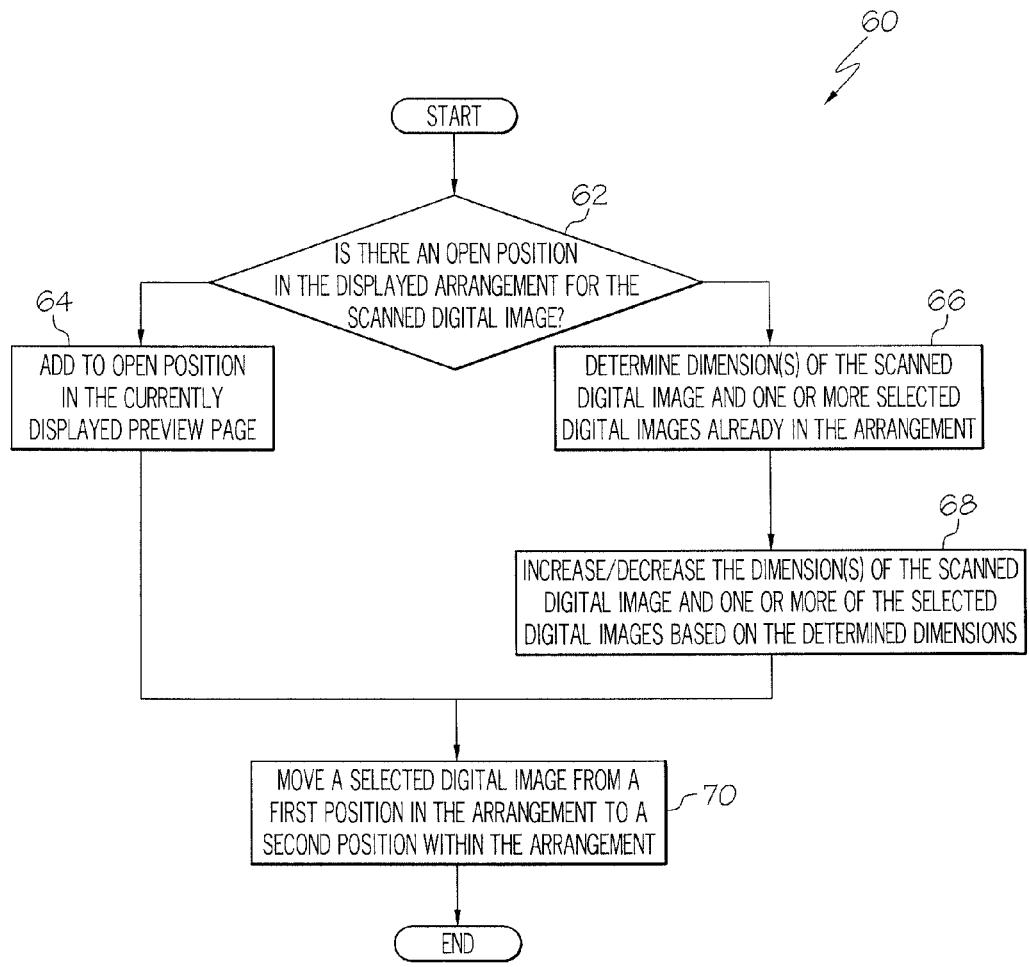
FIG. 5 is a flow diagram illustrating a method for arranging the scanned images on a preview page for display to a user according to an embodiment of the present disclosure.

FIG. 5 is a flow diagram illustrating how the photocopier 10 functions to add a given digital image of a scanned document D to an arrangement currently displayed on a preview page, such as preview page 30, for example, or for adding the digital image to a newly created preview page.

Particularly, after receiving a scanned document D, the method 60 first determines whether an open position in the arrangement exists. This determination may be accomplished for each scanned document D and using any means known in the art. However, in one aspect, the photocopier 10 monitors the open positions that are available in the preview page 30. As stated previously, these open positions may comprise the open areas of a selected template, or the calculated free space that exists between the digital images in the current arrangement that are large enough to receive an image. If the current preview page 30 has an open position available to receive the digital image (box 62), the method 60 will insert the digital image into the open position in the preview page 30 (box 64). If there are no open positions, or if there are positions that are too small for a given digital image to be added, the method 60 determines the dimensions of the digital image and of one or more of the digital images that are already in the arrangement (box 66). The method 60 may then increase and/or decrease the footprint of any of the digital images in order to fit the scanned digital image into the arrangement of digital images on the preview page 30 (box 68).

Such re-sizing of the digital images may be performed automatically by the photocopier 10, or performed manually by the user using any number of existing techniques. In either case, however, the maximum and/or minimum sizes of any given digital image may or may not be restricted. In cases where there are size restrictions, such restrictions may be stored as a profile associated with the photocopier 10, the user, or both.

In some cases, the user may wish to move a selected digital image from one position in the arrangement to another position in the arrangement (box 70). In these cases, the user could simply place the photocopier 10 into an editing mode, and move a selected digital image from a first position in the currently displayed arrangement to a second, different position in the currently displayed arrangement of digital images using any drag-n-drop technology known in the art, for example.

Figure 6:
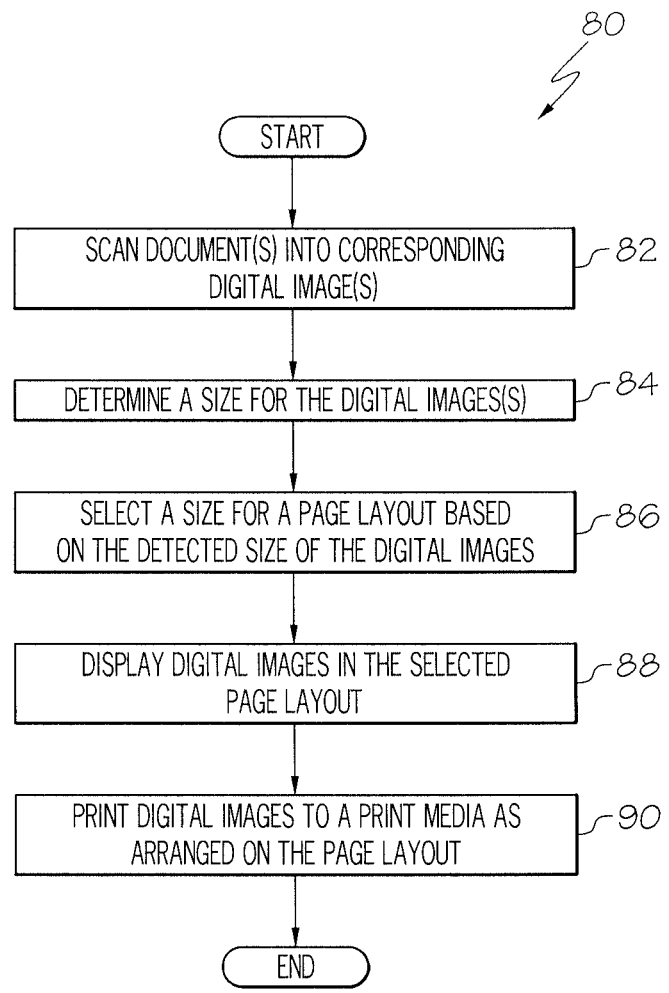
FIG. 6 is a flow diagram illustrating a method for arranging the scanned images on a preview page for display to a user according to another embodiment of the present disclosure.

FIG. 6 is a flow diagram illustrating a method 80 of arranging scanned digital images on a single page layout according to another embodiment of the present disclosure. As seen in method 80, the scanning session begins with a user operating the photocopier 10 to scan one or both sides of one or more documents into corresponding digital images (box 82). As previously stated, individual documents may be placed manually onto the scanning surface 14 by the user, or placed in the automatic document feeder 16 and fed automatically to the scanning surface 14. Once all documents have been scanned and their corresponding digital images generated, the scanning session ends. The photocopier 10 then determines a size for the digital images (box 84).

Particularly, the photocopier 10 estimates the total area on a single page layout that would be covered by all of the digital images. Based on that determined size, the photocopier 10 selects an appropriate size for the single page layout (box 86), and in some cases, for the print medium on which the digital images are printed. Alternatively, a user may manually select a size for the single page layout.

Regardless of how a size is selected, however, in one embodiment, for example, the size for the single page layout is selected to be the same as, or larger than, the size determined for the digital images. This is to ensure that all the images are able to fit onto the single page layout. Once selected, the photocopier 10 displays all of the digital images in the selected single page layout (box 88). The user can, as previously described, re-arrange or edit the digital images as desired. However, once finished, the photocopier 10 prints the digital images to a single print medium (e.g., a single sheet of paper) as the images are arranged on the single page layout (box 90).

Figure 7:
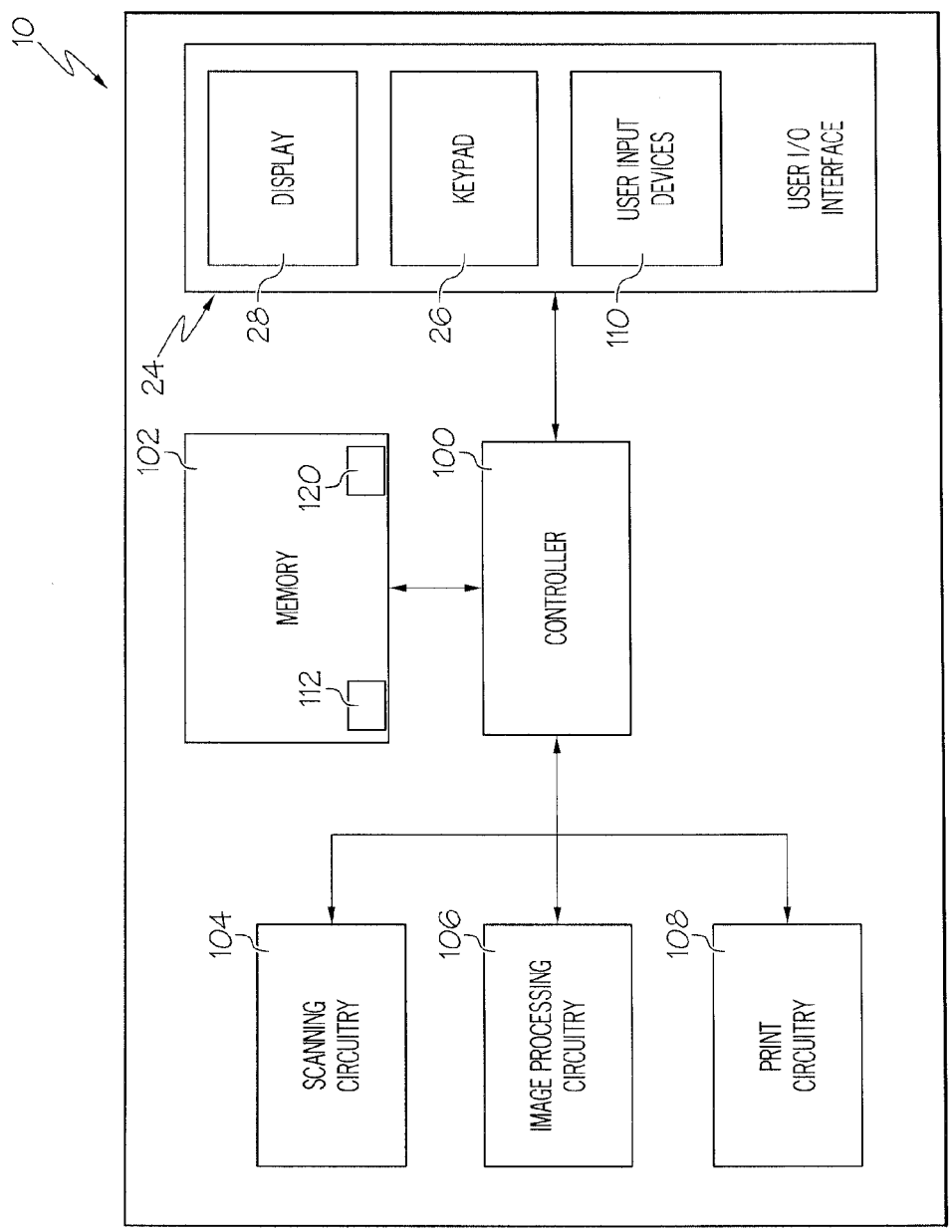
FIG. 7 is a block diagram illustrating some of the components of an imaging system configured according to an embodiment of the present disclosure.

FIG. 7 illustrates some of the components in a photocopier 10 that is configured to function according to one or more embodiments of the present disclosure. As seen in FIG. 6, photocopier 10 comprises a programmable controller 100, a memory 102, the user interface 24, scanning circuitry 104, such as an optical scanner, image processing circuitry 106, and printing circuitry 108.

The programmable controller 100 may be implemented by one or more microprocessors, hardware, firmware, or a combination thereof, and generally controls the operation and functions of the photocopier 10. Such operations and functions include, but are not limited to, controlling the scanning circuitry 104 to scan a series of documents D to generate corresponding digital images of the documents D, controlling the image processing circuitry 106 to image process the captured scans, and controlling the print circuitry 108 to print the captured digital images of the scanned documents D on a print medium, such as paper, according to the embodiments as previously described. In addition, the programmable controller 80 accepts user input from the keypad 26 of user interface 24, as well as from other user input devices 110 (e.g., a mouse), and displays the arrangement of digital images on the preview page 30 on display 28 in accordance with that input. This includes inserting the digital images into the preview page 30 where they will fit and possibly re-sizing and/or moving one or more of the digital images to facilitate insertion into the arrangement. However, these operations and functions may also be performed by the programmable controller 100 of photocopier 10 automatically and autonomously independently of user interaction.

The memory 102 may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 102 stores programs and instructions, such as control application 120 and digital images 112. The control application 120, when executed by controller 100, controls the programmable controller 100 to perform the functions previously described.

The scanning circuitry 104, the image processing circuitry 106, and the print circuitry 108 all receive commands from the controller 100 executing the control application 120. Particularly, the scanning circuitry 104 comprises the hardware and software components required by the photocopier 10 to scan a series of document Ds into corresponding digital images. Similarly, the print circuitry 108 comprises the hardware circuits required by the photocopier 10 to print the digital images corresponding to those in a preview page 30.

The image processing circuitry 106 comprises the hardware and software needed to image process the scanned images. By way of example only, the image processing circuitry 106 functions to digitize the scanned images, and to determine the sizes of the scanned images for adding to the preview page 30. In cases where the digital images are displayed at a low resolution, the image processing circuitry 106 is configured to detect the edges or borders of the digital images using known techniques, and to generate an outline of the digital image for the display 28 to represent the digital image. This is especially helpful for photocopiers 10 that have only a low resolution display 28, or have access to limited resources, as they need not display the scanned digital images in their entirety.

As previously described, aspects of the present disclosure have been explained within the context of a photocopier 10 that is a photocopier device. However, those of ordinary skill in the art should readily appreciate that the disclosure is not so limited. As seen in FIG. 8, for example, the photocopier 10 according to another embodiment of the present disclosure comprises a computing device 130, a flatbed scanner 132, and a printer device 134. In this embodiment, the components are independent of each other but communicate data, commands, and instructions between each other via wireline or wireless communications links, as is understood in the art. Further, the programmable controller 80 functions within the computing device 112 and controls the separate flatbed scanner 114 and printer 116 according to the methods previously described.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method comprising:
   generating a first digital image corresponding to a front side of a document scanned by a photocopier during a scanning session;
   arranging the first digital image with a second digital image in a non-overlapping orientation in a single page layout for display to the user, wherein the second digital image corresponds to an a back side of the document previously scanned by the photocopier during the scanning session;
   displaying the first digital image with the second digital image in the single page layout as arranged in the non-overlapping orientation;
   prompting a user to indicate whether to keep the first digital image in the single page layout;
   printing the first and second digital images on a single sheet of paper in the non-overlapping orientation as arranged in the single page layout if the user chooses to keep the first digital image in the single page layout; and
   displaying each digital image in the single page layout as an outline representing the digital image if a current resolution of the display device does not exceed a predetermined threshold.

2. The method of claim 1 wherein the arranged digital images cover an area of a first size, and further comprising selecting a second size for the single page layout that is larger than the first size.

3. The method of claim 1 further comprising:
   prompting the user to indicate whether to re-arrange one or both of the first and second digital images on the single page layout during the scanning session; and moving a selected one of the first and second digital images from a first position in the single page layout to a second position in the single page layout during the scanning session.

4. The method of claim 1 further comprising adjusting a size of the second digital image in the single page layout to allow the first and second digital images to fit within the single page layout.

5. The method of claim 1 further comprising:
generating a third digital image corresponding to a document scanned by the photocopier during the scanning session;
prompting the user to indicate whether to start a new single page layout to preview the third digital image; and
based on the user's response, generating the new single page layout and adding the third digital image to the new single page layout.

6. A photocopier device comprising:
an optical scanner configured to scan documents into digital images; a display configured to display the digital images to a user; and
a processing circuit communicatively connected to the optical scanner and the display and configured to:
generate a first digital image corresponding to a front side of a document scanned by the optical scanner during a scanning session;
arrange the first digital image with a second digital image in a non-overlapping orientation in a single page layout for display to the user, wherein the second digital image corresponds to a back side of the document previously scanned by the optical scanner during the scanning session;
display the first digital image with the second digital image in the single page layout as arranged in the non-overlapping orientation;
prompt the user to indicate whether to keep the first digital image in the single page layout;
print the first and second digital images on a single sheet of paper in the nonoverlapping orientation as arranged in the single page layout if the user chooses to keep the first digital image in the single page layout; and
wherein if a current resolution of the display device does not exceed a predetermined threshold, the processing circuit is further configured to display each of the first and second digital images as outlines respectively representing the first and second digital images.

7. The photocopier device of claim 6 wherein the processing circuit is further configured to:
determine a coverage size for the first and second digital images, wherein the coverage size comprises an area on the single page layout expected to be covered by the first and second digital images; and
select a size for the single page layout based on the coverage size.

8. The photocopier device of claim 6 wherein the processing circuit is further configured to:
prompt the user to indicate whether to re-arrange one or both of the first and second digital images on the single page layout; and
move a selected one of the first and second digital images from a first position in the single page layout to a second position in the single page layout.

9. The photocopier device of claim 6 wherein the processing circuit is further configured to adjust a size of the second digital image in the single page layout to fit the first and second digital images within the single page layout.

10. The photocopier device of claim 6 wherein the processing circuit is further configured to:
generate a third digital image corresponding to a document scanned by the photocopier during the scanning session;
prompt the user to indicate whether to start a new single page layout to preview the third digital image; and
based on the user's response, generate the new single page layout and add the third digital image to the new single page layout.

11. A computer program product comprising:
a non-transitory computer readable medium configured to store a control application that, when executed by a processing circuit in a photocopier device, configures a controller to:
generate a first digital image corresponding to a document scanned by the optical scanner during a scanning session;
arrange the first and second digital images on the single page layout in a non-overlapping orientation for display to the user, wherein the second digital image corresponds to an opposing side of the document previously scanned by the optical scanner during the scanning session;
display the first digital image with the second digital image in the single page layout as arranged in the non-overlapping orientation;
prompt the user to indicate whether to keep the first digital image in the single page layout;
print the first and second digital images on a single sheet of paper in the non-overlapping orientation as arranged in the single page layout if the user chooses to keep the first digital image in the single page layout; and
wherein if a current resolution of the display device does not exceed a predetermined threshold, the control application further configures the processing circuit to display each of the first and second digital images as outlines respectively representing the first and second digital images.

12. The computer program product of claim 11 wherein the control application further configures the processing circuit to:
determine a coverage size for the first and second digital images, the coverage size comprising an area on the single page layout expected to be covered by the first and second digital images; and
select a size for the single page layout based on the coverage size.

13. The computer program product of claim 11 wherein the control application further configures the processing circuit to:
prompt the user to indicate whether to re-arrange a position of one or both of the first and second digital images on the single page layout; and
move a selected one of the first and second digital images from a first position in the single page layout to a second position in the single page layout.

14. The computer program product of claim 11 wherein the control application further configures the processing circuit to adjust a size of one or both of the first and second digital images to fit the one or both of the first and second digital images within the single page layout.

15. The computer program product of claim 11 wherein the control application further configures the processing circuit to:

generate a third digital image corresponding to a document scanned by the photocopier during the scanning session;
prompt the user to indicate whether to start a new single page layout to preview the third digital image; and
based on the user's response, generate the new single page layout and add the third digital image to the new single page layout.

\* \* \* \* \*